H. G. NOBLE.
OIL CUP.
APPLICATION FILED JAN. 10, 1921.

1,429,448.

Patented Sept. 19, 1922.

INVENTOR
Harry G. Noble
by
Owen, Owen & Crawington

Patented Sept. 19, 1922.

1,429,448

UNITED STATES PATENT OFFICE.

HARRY G. NOBLE, OF TOLEDO, OHIO.

OIL CUP.

Application filed January 10, 1921. Serial No. 436,060.

*To all whom it may concern:*

Be it known that I, HARRY G. NOBLE, a citizen of the United States, and a resident of Toledo, in the county of Lucas and State of Ohio, have made an invention appertaining to Oil Cups, and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an oil cup that will automatically deliver oil from time to time to the moving part of a device or a machine, and, moreover, is so constructed that the oil cup may be cleaned so as to remove any oil that may be gummed, or so as to prevent the gumming of the oil.

The invention may be contained in structures of different forms, and to illustrate a practical application I have selected one form of construction containing the invention and shall describe it hereinafter. The structure selected is illustrated in the accompanying drawings.

Figure 1:
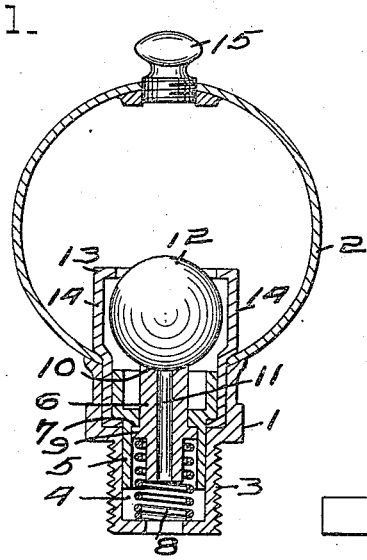
Figure 2:
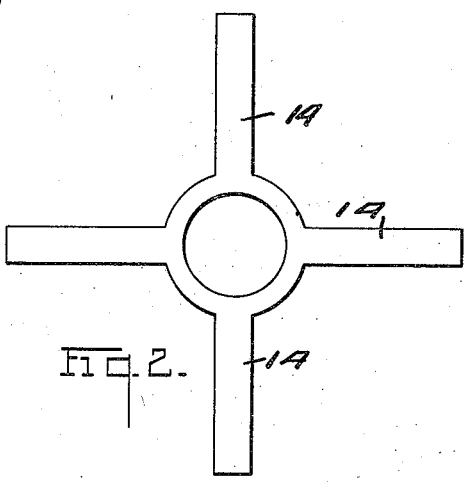
Figure 3:
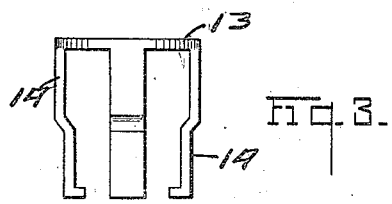

Figure 1 of the drawings is a sectional view of the oil cup. Fig. 2 is an illustration of a blank from which a cage is formed, and used for maintaining a valve in position in the oil cup shown in Fig. 1. Fig. 3 illustrates the valve cage.

1 in the drawings is a stem or plug to which an oil receptacle 2 is connected. The plug 1 is provided with a threaded portion 3 that may be screwed in a part of a mechanism which is to be oiled by the oil inserted in the receptacle 2.

The plug 1 is provided with an opening 4 of sufficient size to receive the shell 5 that is provided with a spring pressed plunger 6. The shell 5 and the plunger 6 are provided with shoulders 7 that are pressed together by the spring 8 located intermediate the bottom of the plug 3 and the flange 9 formed on the plunger 6. The spring 8 thus operates to raise the plunger 6 to press the shoulders 7 against each other. The upper end of the plunger is provided with a recess 10 having a substantially spherical surface, and the plunger is provided with a central bore 11 through which the oil from the receptacle 2 may pass. The opening 11 extends from the recess 10 through the plunger to its lower end thereof. Free flow of the oil, however, is prevented by the ball 12 that is supported on the upper end of the plunger, and so that a portion of its surface is located in the recess 10 which normally seals the outlet of the oil cup and prevents the flow of the oil to the parts to be oiled when the ball 12 is in the position described.

The ball 12 is surrounded by a cage 13 which is formed from a sheet metal blank such as that shown in Fig. 2. The blank may be formed so as to have three or more legs 14, and the legs may be bent down so as to form a cylindrical cage as shown in Fig. 3. The legs are secured between the shell 5 and the post 1, and thus the cage is supported in position around the upper end of the plunger 6. The cage is of a size so that the ball 12 may be contained therein, and yet is small enough to prevent more than a very slight movement of the ball on its seat formed on the upper end of the plunger 6.

When the oil cup has been attached to the device to be lubricated and the oil inserted in the receptacle 2, the ball 12 will prevent the flow of the oil until the parts vibrate or are shaken in their operation, which causes the ball 12 to shake or tilt on its seat and allow the escape of the oil in the receptacle drop by drop as the ball 12 passes from one side of the cage to the other, or if the ball 12 is lifted from its seat. By this arrangement the machine is oiled as it is used and the flow of the oil ceases when the machine stops running. This prevents clogging of the oil cups in the machine, and, moreover, provides fresh oil as it is being used up by the machine.

If it is desired to clean the cup it may be done by connecting the oil container 2 with a source of air pressure supply, which will operate to force the plunger 6 down a short distance against the pressure of the spring 8, while the ball will be held within the cage and will be supported on the top of the shell 5, which will permit the air to force the oil through the passageway 11 and through the oil cup of the machine to which the plug 1 may be connected. If desired the cup 2 may be provided with a threaded plug 15 for closing the container 2, and which is of a size sufficient to permit connection with a source of air pressure supply such as to an air pump or lubricant pressure pump.

I claim:

1. In an oil cup, a shell, an oil container secured to the shell, a tubular member located in the shell and communicating with the container, a spring for raising the tubular member, means for limiting the movement of the tubular member by the action of the spring, a ball seated on the end of the tubular member for closing the opening of the tubular member except as the ball may be tilted from the end of the passageway through the tubular member, a cage surrounding the tubular member for limiting the movements of the ball.

2. In an oil cup, a shell, an oil container connected to the shell, a sleeve located within the shell, a tubular plunger, the tubular plunger and the shell having coacting shoulders, a spring located intermediate the tubular plunger and the bottom of the shell, the shoulders operating to limit the movement of the tubular plunger under the pressure of the spring, a ball seated on the upper end of the tubular plunger when the plunger is raised by the action of the spring, a cage for limiting the lateral movements of the ball and the downward movement of the ball when the tubular plunger is lowered against the action of the spring.

3. In an oil cup, a shell, a container located on the shell, a tubular spring pressed plunger located in the shell, a ball seated on the upper end of the tubular plunger when the plunger is raised, a cage for limiting the lateral movement of the ball relative to the upper end of the tubular plunger and to support the ball when the tubular plunger is depressed.

4. In an oil cup, a shell, a container located on the shell, a tubular spring pressed plunger located in the shell, a ball seated on the upper end of the tubular plunger when the plunger is raised, a cage for limiting the lateral movement of the ball relative to the upper end of the tubular plunger, means for supporting the ball away from the end of the tubular plunger when the tubular plunger is depressed.

In testimony whereof, I have hereunto signed my name to this specification.

HARRY G. NOBLE.